Figure 1:
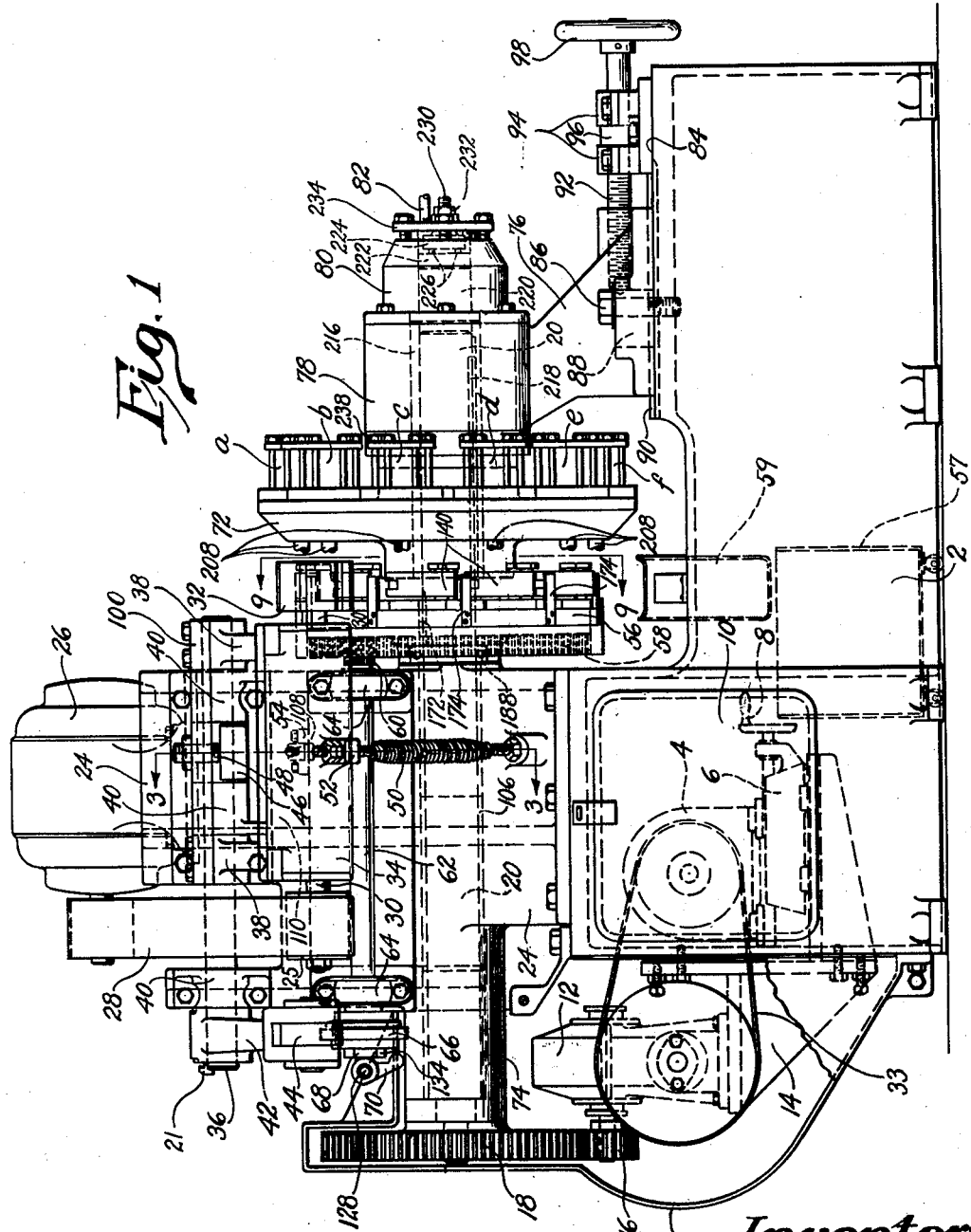

May 26, 1953 G. R. CONSTANTINE ET AL 2,639,742
WEDGE-HEEL SHAPING MACHINE
Filed Jan. 21, 1947 9 Sheets-Sheet 1

Inventors
Arthur F. Ball
George R. Constantine
by David Rines, Attorney

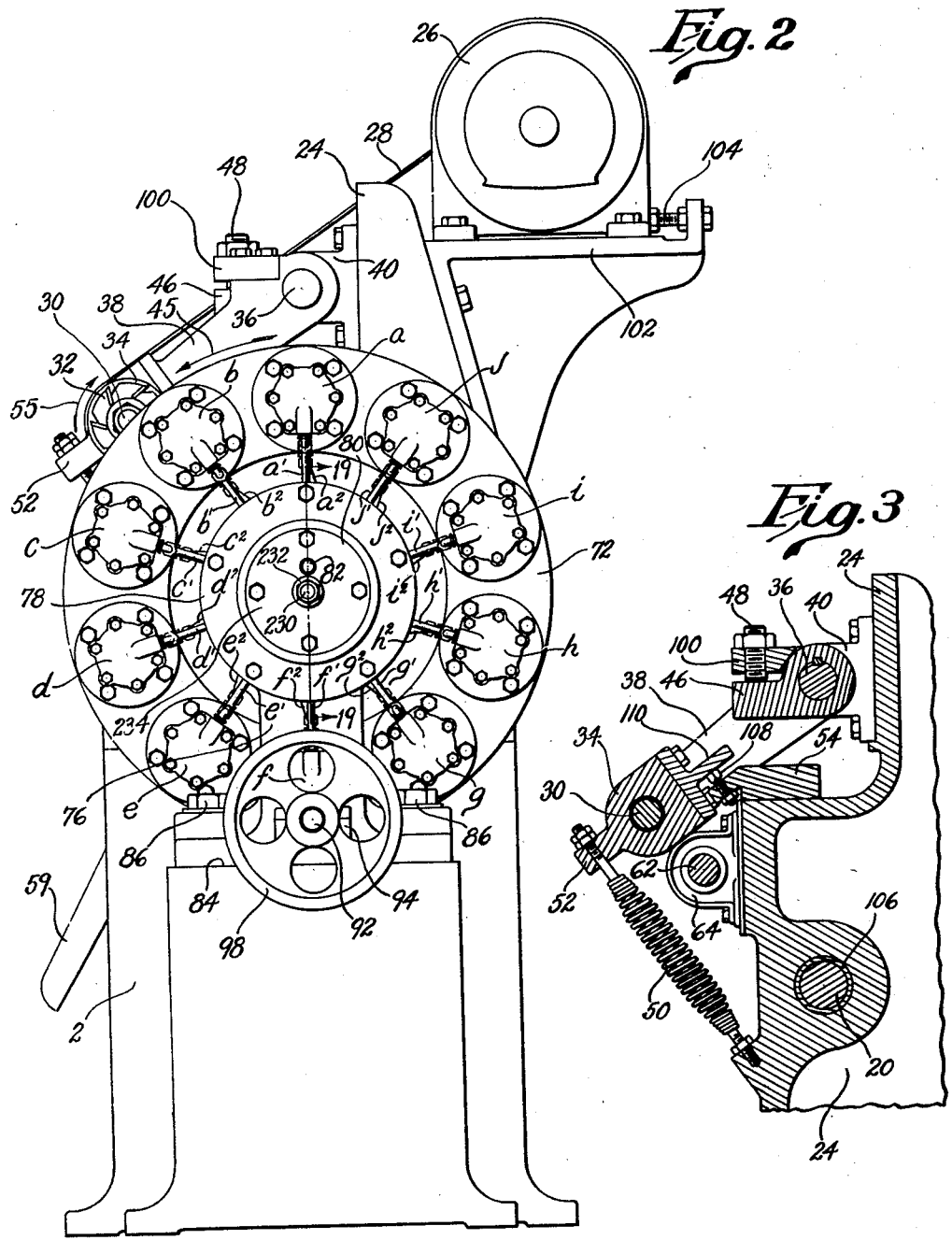

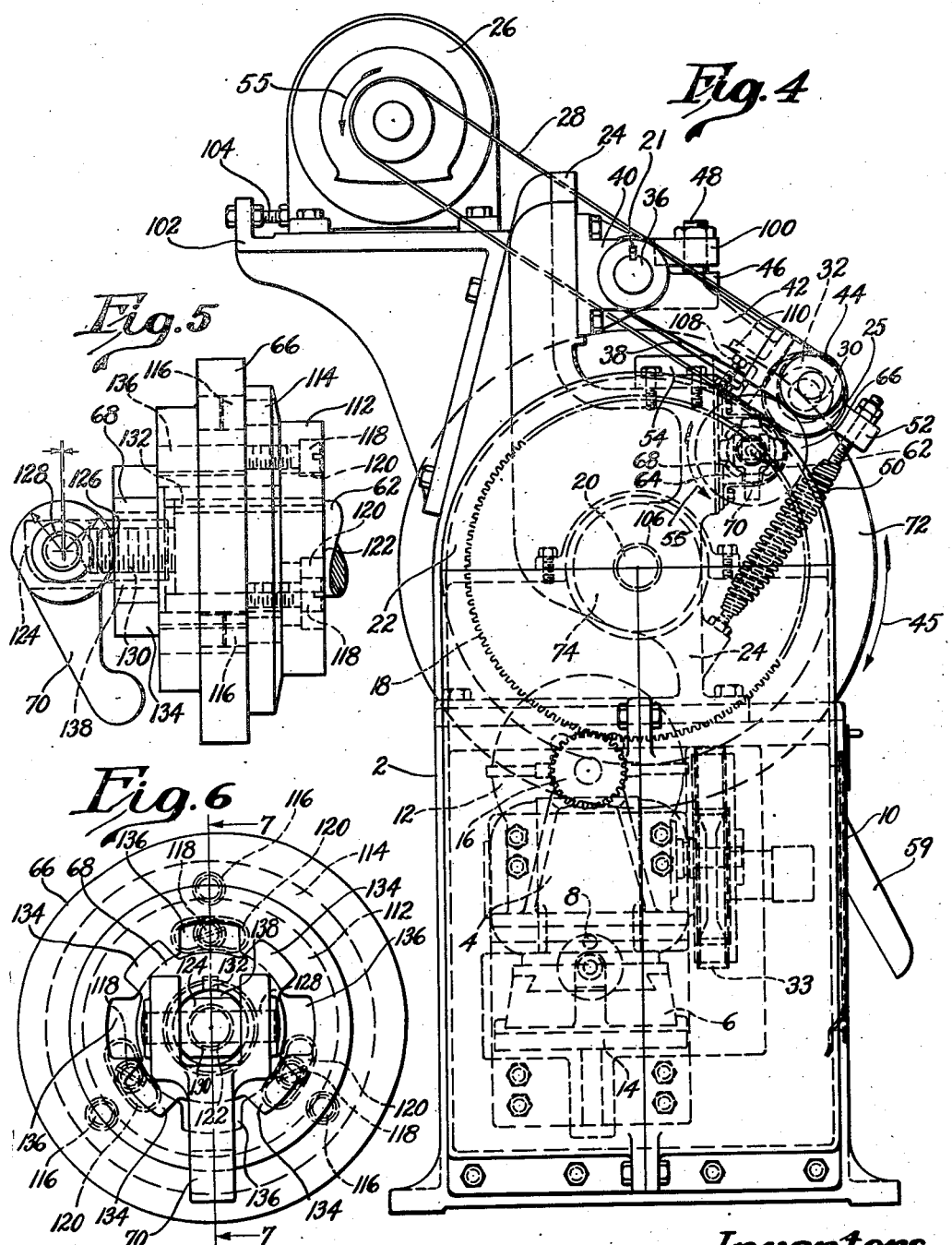

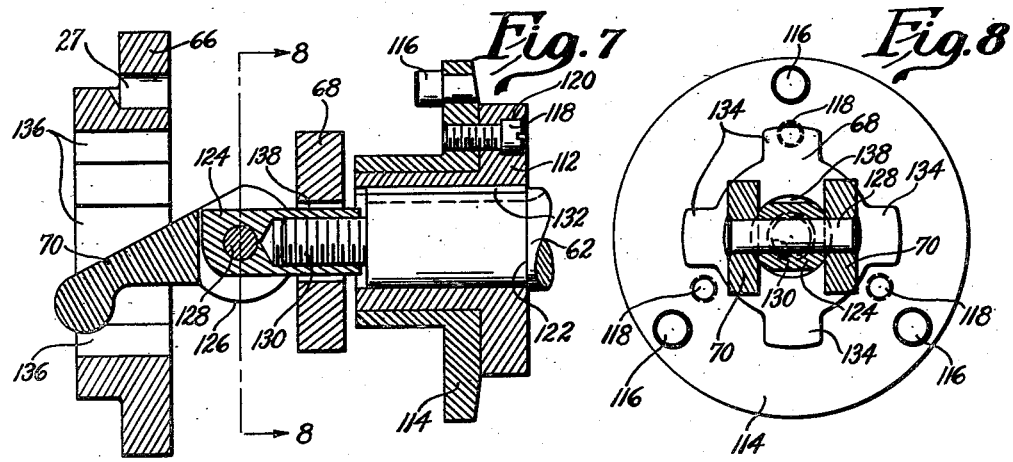
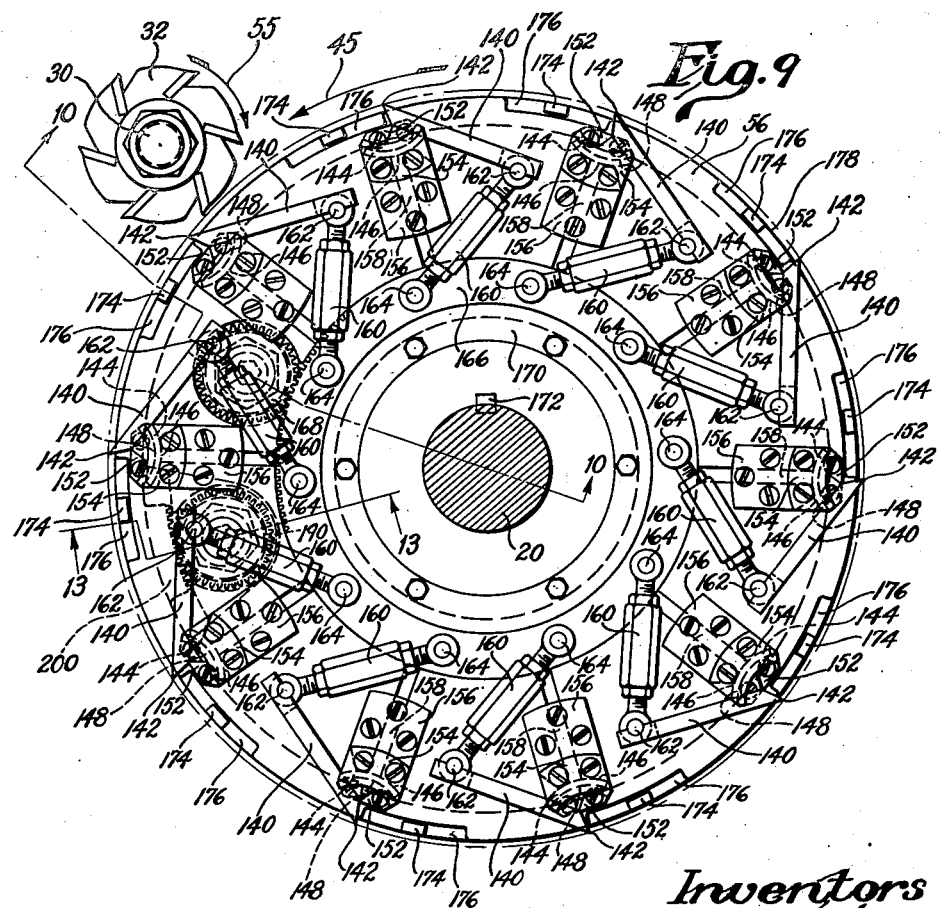

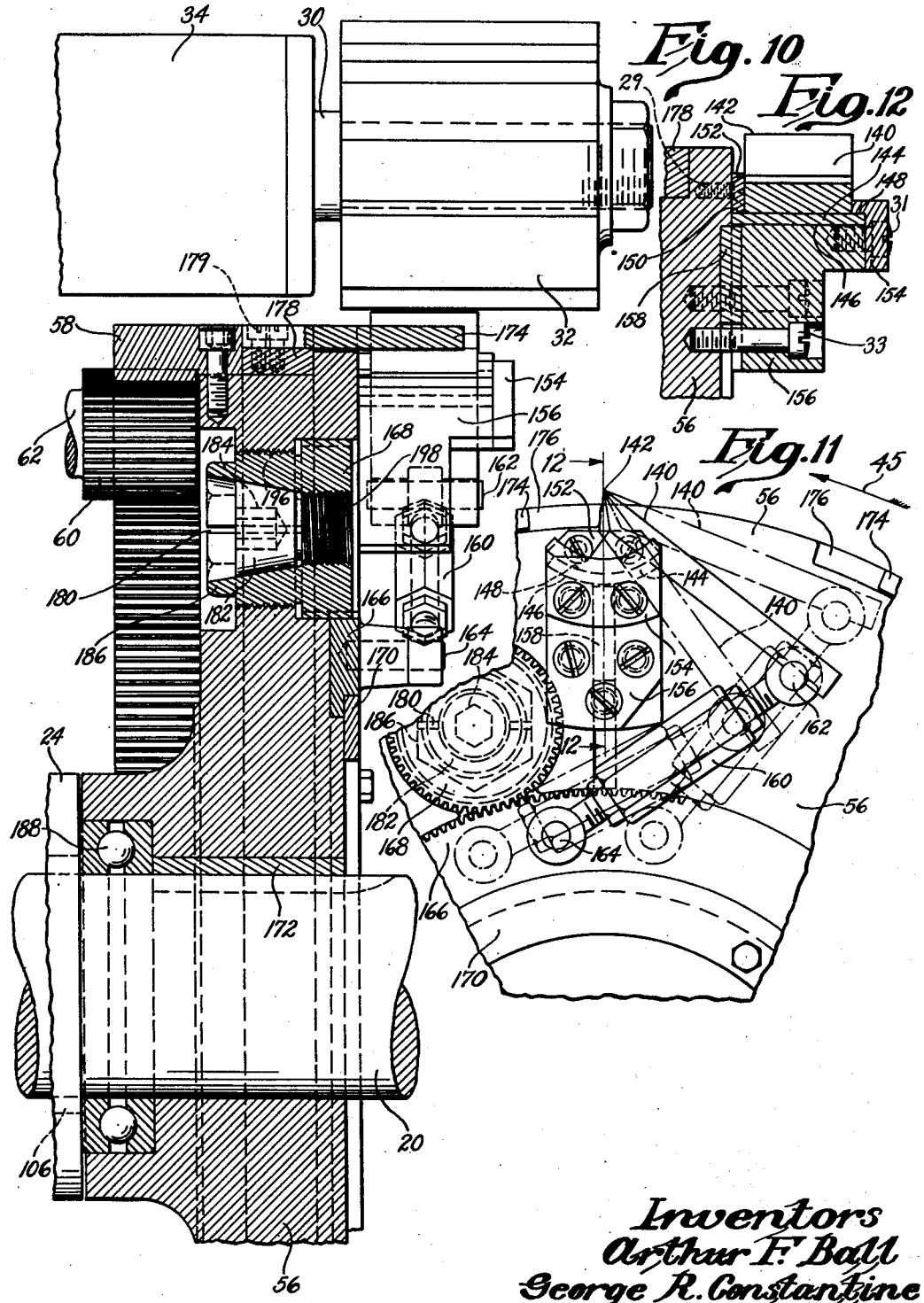

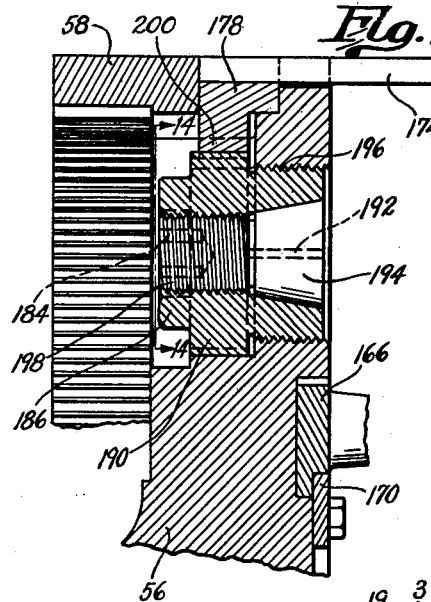
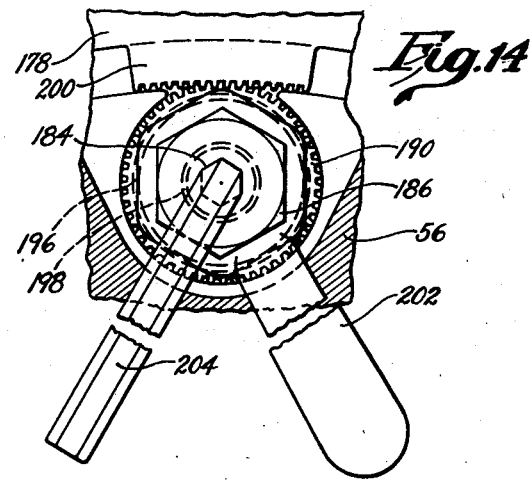
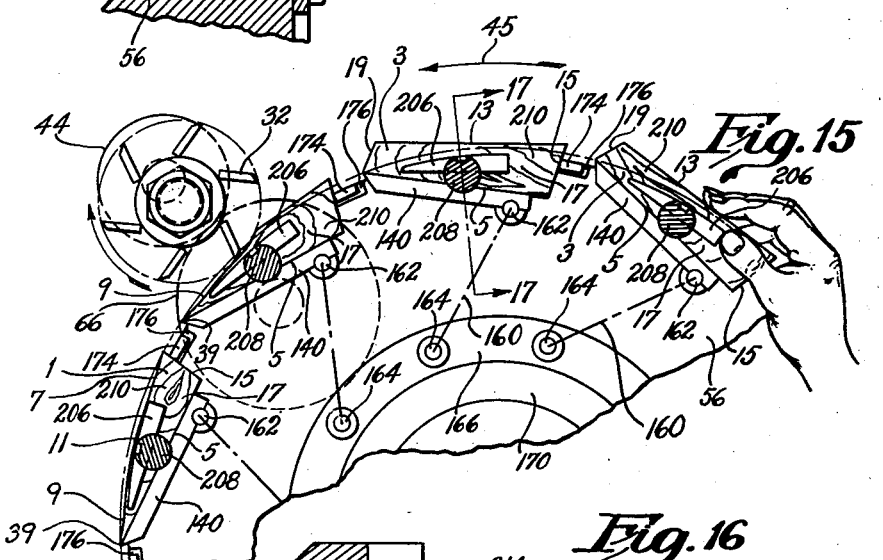
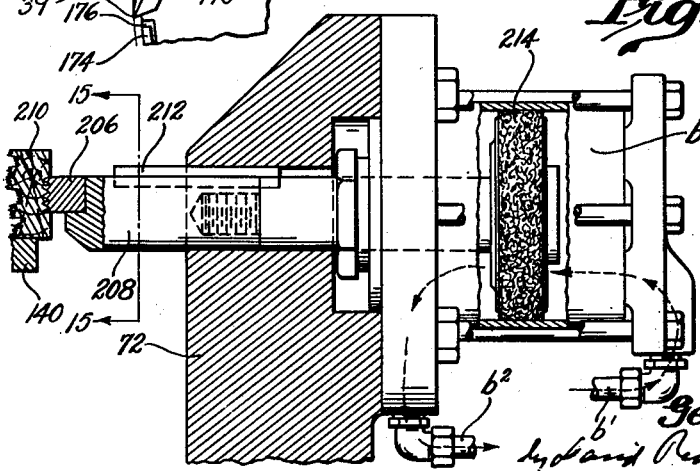

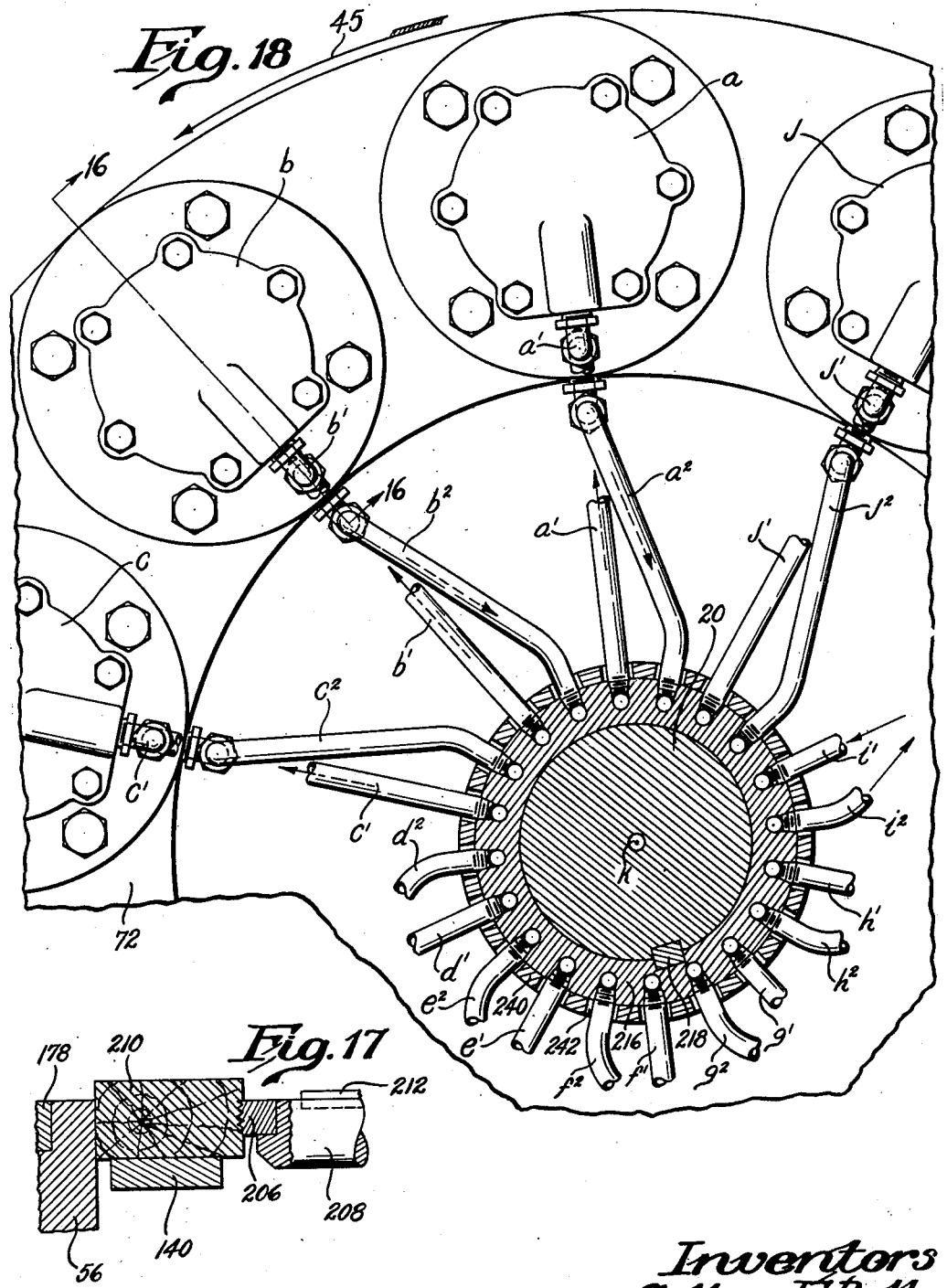

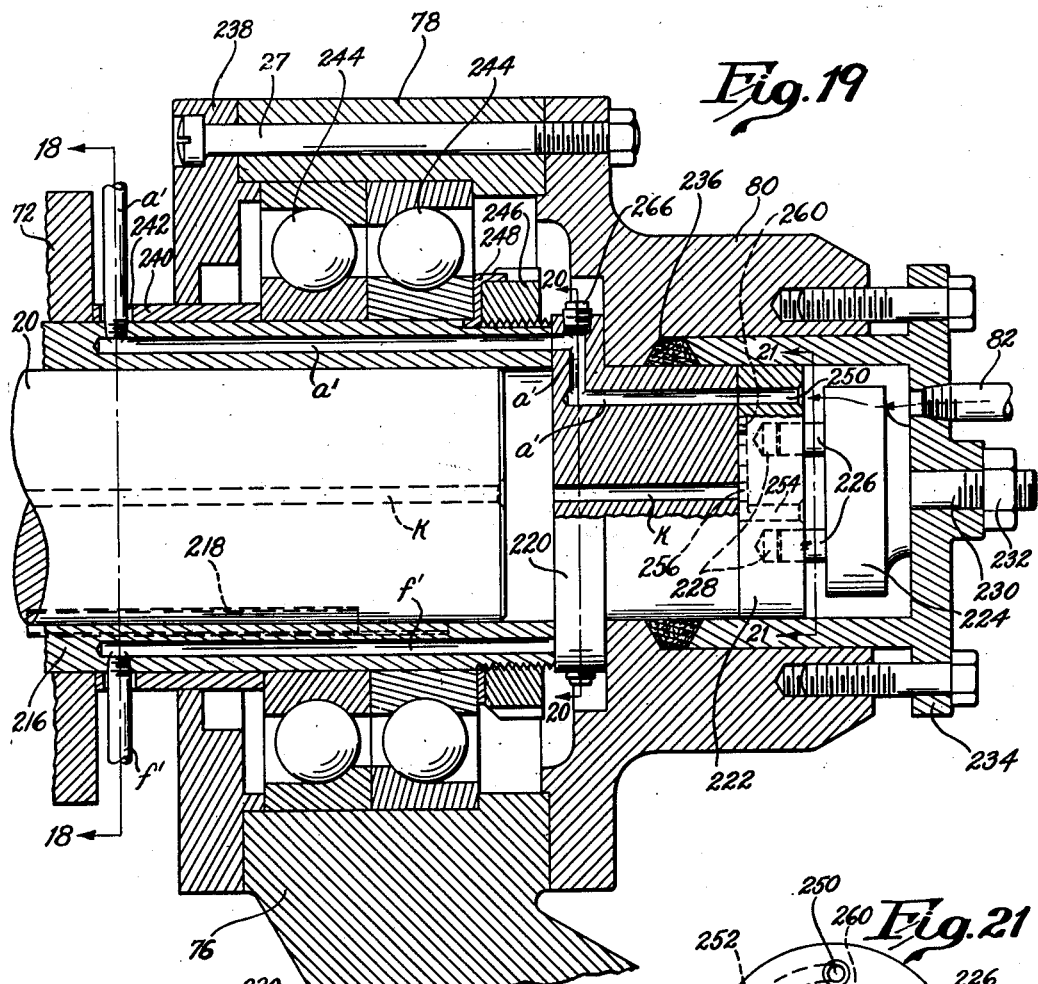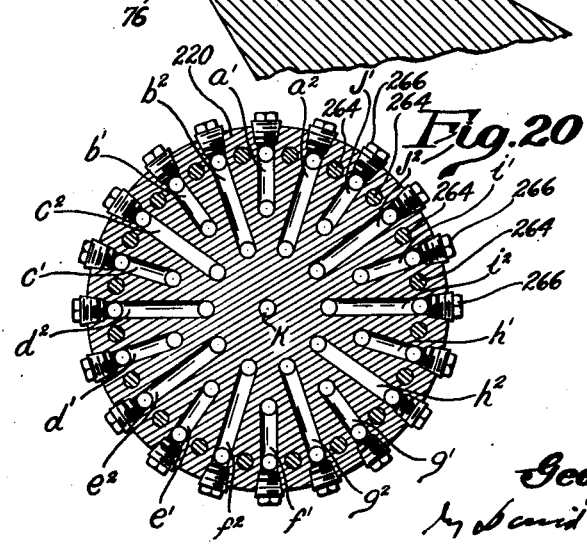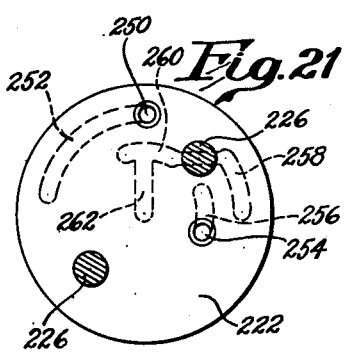

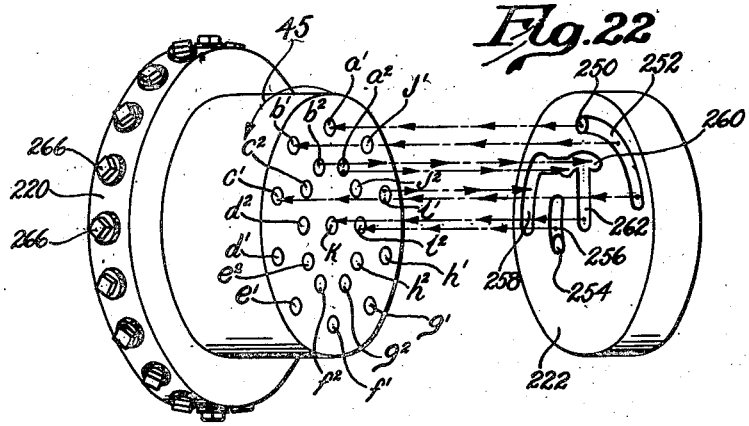
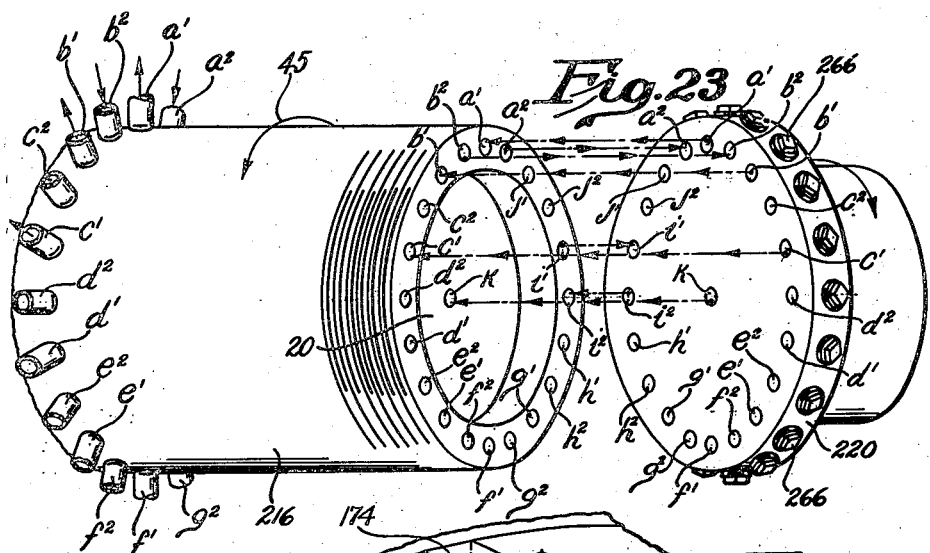
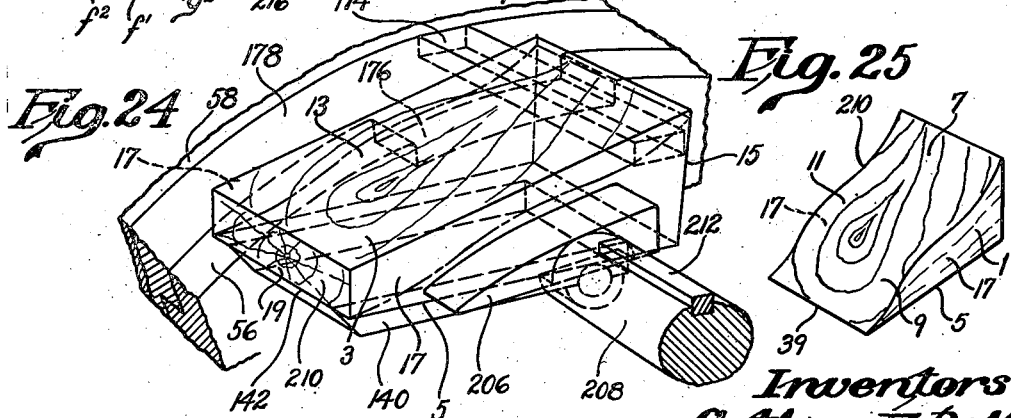

Patented May 26, 1953

2,639,742

UNITED STATES PATENT OFFICE 2,639,742

WEDGE-HEEL SHAPING MACHINE

George R. Constantine and Arthur F. Ball, Haverhill, Mass., assignors to The Service Wood Heel Co., Lawrence, Mass., a corporation of Massachusetts Application January 21, 1947, Serial No. 723,366

18 Claims. (Cl. 144—142)

The present invention relates to machines of the type provided with a support having a plurality of stations at one or more of which wedge-heel blanks or blocks are supplied for presentation to a cutter operating member or members at another station or stations for shaping the heel-attaching or arch portions of the wedge-heel blanks or blocks.

Wedge heels are fashioned from heel blanks that, like other articles of manufacture, are made of wood, cork and other materials. Their manufacture, however, presents problems that are ordinarily not met with in the manufacture of other articles, though some of the problems do exist in industries additional to the heel-making industry. Many of the problems connected with the manufacture of wedge heels, indeed, are non-analogous even to those connected with the manufacture of even other types of heels. This is because the shapes of wedge heels are so different from the shapes of other heels, and because what is required of them under conditions of actual use is also different.

The arch of a wedge heel should conform accurately to the arch of the wearer's foot. No two human arches, however, are exactly alike. In theory, therefore, it would be necessary, in order to fulfill the requirements of different wearers, to fashion a separate arch properly shaped to each different foot. As this theoretical end, of course, is practically impossible of actual attainment, a compromise is attempted, with the object in view of satisfactorily meeting the needs of a great majority of the people. It suffices, toward the attainment of this end, to build a number of standard wedge heels, each provided with an arch conforming in shape approximately to the arches of many wearers. In order to attain even this practical compromise between theory and actuality, however, the number of standard wedge heels required to be manufactured is necessarily rather large.

It is an object of the present invention to solve a few of the above-described problems.

A further object is to provide a new and improved machine for operating on wedge-heel blanks or blocks.

With the end in view of avoiding the necessity for providing as many separate machines as there are different standard wedge heels to be manufactured, another object of the invention is to provide a new and improved machine that shall be readily adaptable to the shaping of the heel-attaching or arch portions of a very large number of sizes and shapes of the numerous standard wedge heels that are ordinarily manufactured.

A further object of the invention is to provide a novel multi-station machine of the above-described character provided with a controlling cam that shall operate throughout a complete cycle once corresponding to the operation of the machine between successive stations.

Another object still is to provide a machine of the above-described character the cutter of which shall operate throughout a complete cycle corresponding to each presentation of a wedge-heel blank thereto.

A further object is to provide a new and improved machine of the above-described character the cutter of which shall operate throughout a complete cycle during a correspondingly complete rotation of a suitably shaped rotatable controlling cam.

Still another object of the invention is to render the machine adjustable, so as to provide for different sizes, shapes and inclinations of wedge heels to be produced, and for wear of the machine; and, in particular, to provide for ready replacement of the controlling cam whenever it is desired to obtain a different wedge heel, as well as to obtain proper operation of the cutter in conjunction with the replaced cam.

Another object is to provide a new and improved automatic heel-arch-shaping machine that shall be readily adaptable for the manufacture of wedge heels of different sizes, shapes and inclinations.

A further object is to provide a new and improved machine of the above-described character the wedge-heel-clamping jacks of which shall be provided with wedge-heel-receiving platforms that shall be simultaneously adjustable with a minimum of time and effort to enable the jacks successively to present properly to the cutter first the thin edges of the wedge-heel blanks and then the remaining portions of the blanks.

Another object is to provide for similar simultaneous adjustment of a plurality of stops, one corresponding to each wedge-heel-receiving platform.

Other and further objects will be explained hereinafter, and will be more particularly pointed out in the appended claims.

To the attainment of the above ends, in accordance with a feature of the invention, the illustrative machine comprises a rotatable-table work support having a plurality of stations at one of which the wedge-heel blanks or blocks are successively supplied, each upon a platform between the jaws of one of the simultaneously adjustable wood-heel-clamping jacks, as the jacks are successively presented to that station. After becoming substantially clamped in this jack at a predetermined further point in the rotation of the work-table support, the blank or block is carried to another station at which its attaching or arch portion becomes suitably shaped by a cutter. The operation is controlled by a cam that rotates throughout a complete cycle once corresponding to the operation of the machine between successive stations, in order to effect a correspondingly complete cycle of the arch-shaping operation of the cutter upon the wood-heel blank. The pneumatic clamping pressure becomes thereafter released in order to enable the heel blank or block to fall into a hopper at another point in the rotation of the work support.

The invention will now be more fully described in connection with the accompanying drawings, in which Fig. 1 is a rear elevation of a machine embodying the invention, in preferred form; Fig. 2 is a right-hand end elevation of the same, upon a larger scale than in Fig. 1; Fig. 3 is a similarly enlarged vertical section upon the line 3—3 of Fig. 1, looking in the direction of the arrows; Fig. 4 is a left-hand end elevation upon the same scale as in Fig. 2; Fig. 5 is a fragmentary rear elevation of a portion of the machine shown at the left of Fig. 1, but upon a still larger scale; Fig. 6 is a corresponding left-hand end elevation; Figs. 7, 8 and 9 are vertical sections upon the lines 7—7 of Fig. 6, 8—8 of Fig. 7 and 9—9 of Fig. 1, respectively, looking in the directions of the respective arrows, the scale of Fig. 9 being considerably larger than in Fig. 1; Fig. 10 is a section upon the line 10—10 of Fig. 9, looking in the directions of the arrows, but upon a still larger scale; Fig. 11 is a fragmentary view corresponding to Fig. 9, but upon the larger scale of Fig. 10, illustrating the simultaneous adjustment of the wedge-heel-supporting platforms; Figs. 12 to 21, inclusive, are sections taken, respectively, upon the lines 12—12 of Fig. 11, 13—13 of Fig. 9, 14—14 of Fig. 13, 15—15 of Fig. 16, 16—16 of Fig. 18, 17—17 of Fig. 15, 18—18 of Fig. 19, 19—19 of Fig. 2, and 20—20 and 21—21 of Fig. 19, looking in the directions of the respective arrows, the sections of Figs. 13, 17 and 19 being upon a larger scale than in Figs. 9, 15 and 2, respectively, and the section of Fig. 15 being upon a smaller scale than in Fig. 16; Figs. 22 and 23 are exploded isometric views of details illustrating the paths of travel of the air or other fluid to and from the pneumatically operating clamping jacks; Fig. 24 is a similar isometric view of a wedge-heel blank or block shown clamped in its jack prior to the arch-shaping operation; and Fig. 25 is a similar isometric view of the same blank, as it appears after the wedge-heel blank or block shown in Fig. 24 has been operated upon by the machine of the present invention.

At the right of Fig. 15 and in Fig. 24, there is shown a rough-sawed wood-heel blank or block 3 that is originally, prior to operation thereon by the machine of the present invention, provided with side faces 17, a lower tread face 5 and an upper heel-attaching-portion or arch-portion face 13. The tread face 5 and the heel-attaching-portion or arch-portion face 13 are shown flat and inclined to each other at an angle, thus providing a wedge shape, with a thick back or rear heel end 15 and a thin front or head end 19.

The machine of the present invention molds or shapes the heel-attaching or arch portion of the wedge-heel blank 3 to convert it into the wedge-heel blank 1 shown at the left of Fig. 15 and in Fig. 25. The upper heel-attaching-portion or arch-portion face 13 becomes thus provided with a heel portion 7 at the thick or rear end 15 of the wedge, and a shank portion 9. At one side, the shank portion 9 merges with the heel portion 7 at an intermediate or arch portion 11. At its other side, the shank portion 9 meets the tread face 5 at the thin front or head end 19 of the wedge to provide a thin edge 39.

For the purposes of the present specification, the heel blank 1 may be spoken of as the completed or finished or shaped heel blank, in contradistinction to the original or untreated heel blank 3. It will be understood, however, that the machine of the present invention is adapted to operate, not only upon rough-sawed heel blanks, but also upon heel blanks that have already been previously shaped, as by turning. The numeral 210 is therefore employed to designate the work operated upon, irrespective of whether it is untreated, as shown at 3, or finished, as shown at 1.

The molding of the heel-attaching or arch portion of the untreated wedge-heel blank 3 may be effected with the aid of a molding or shaping cutter 32, Figs. 1, 2, 4, 9, 10 and 15, comprising blades or cutting edges mounted upon a horizontally disposed cutter-shaft spindle 30 that rotates rapidly in a bearing 34. The cutter shaft 30 is rotated in the direction of the arrow 55, Figs. 2, 4 and 9, by a pulley 25, Fig. 4, from a motor 26 through a belt 28. The belt 28 may be tensioned by adjusting the position of the motor 26 on its supporting bracket 102, as by means of a threaded adjusting screw 104, as shown in Figs. 2 and 4.

The untreated heel blanks 3 may be loaded or supplied upon platforms 140 of a table 56, Figs. 1 and 9 to 17. The table 56 constitutes a carrier member for the wedge heel blanks 3. It is continuously rotated in a vertically disposed plane by a horizontally disposed shaft 20, to which the table 56 may be keyed at 172, as shown in Figs. 9 and 10. The shaft 20 is journaled in bearings 74 and 78 supported by frame supports 24 and 76, respectively, as shown in Figs. 1 to 4 and 19. The shaft 20 may be disposed also in a bushing 106 between the bearings 74 and 78, as shown in Figs. 1 and 3. In the bearing 78, the shaft 20 is mounted in a sleeve 216, more fully described hereinafter in connection with Fig. 19, which shows the sleeve 216 as keyed at 218 to the shaft 20. The sleeve 216 is shown mounted in ball bearings 244, which are held in place between a spacing sleeve 240 and a lock washer 248, the washer 248, in turn, being secured by a lock nut 246 threaded upon the free end of the sleeve 216. The ball-bearing assembly is shown confined in the bearing 78 by bolts 27 between a housing cap 238 and an air valve housing 80, more fully to be referred to hereinafter. The thrust of the bearing 78 at this end of the machine is balanced by a thrust bearing 188 that, as shown in Figs. 1 and 10, engages against the bearing support 24.

The shaft 20 is driven by a low-speed motor 4 through a pinion 16 and a gear 18, Figs. 1 and 4. The gear 18 is mounted upon one end of the shaft 20 and the pinion 16 on the shaft of a speed-reducing motor 12 that is mounted on a support 14. The speed-reducing motor 12 is driven from the motor 4 by a belt 33. In order to permit of variation in speed of the belt 33, the motor 4 is mounted upon a base 6 that is provided with a slide base the slidable adjustment of which may be controlled by a handwheel 8, as described more fully in Letters Patent 2,573,692, issued November 6, 1951. The parts are protected by a guard 22, and access may be obtained through a door 10.

The rotary table 56 is shown in Fig. 9 provided with ten wedge-heel-blank-receiving platforms 140, equally spaced along its circumference. The operator stands to the right of the machine, as viewed in Figs. 9 and 15, to load the platforms 140 as they come up successively toward him from below during the rotation of the table 56 in the direction of the arrow 45. The operator so loads the untreated wedge-heel blank 3, as illustrated in Fig. 15, that its thin end 19 shall be disposed in the direction of rotation of the table 56, indicated by the arrow 45, with its thick end 15 positioned against a gage or stop 174. The thin end 19 and the thick end 15 of the wedge-heel blank 3 are thus spaced from each other in the direction of the predetermined path of rotation of the table 56, indicated by the arrow 45. The loading is shown as performed upon that platform 140 that is shown in Figs. 9 and 15 just to the right of the uppermost platform 140. That platform 140 just to the right of the uppermost platform 140 may, therefore, be said to be positioned at the loading station of the machine. The cutter 32 may be regarded as disposed at the operating station of the machine, shown positioned two platforms away from the loading station, in the direction of rotation of the table 56, indicated by the arrow 45.

During the presentation of the untreated heel blank 3 to the molding cutter 32, at the operating station, it is held clamped on its platform 140 in a wood-heel-block-clamping jack or holder comprising two side clamping members. One of these clamping members comprises the face of the vertically disposed rotary table 56. The wedge-heel blanks are positioned with one of their side faces 17 disposed adjacent to the table 56. The other clamping member is constituted of a jaw 206, mounted on the end of a horizontally actuable plunger 208, Figs. 1, 15, 16 and 17. As shown more particularly in Fig. 1, the plungers 208 are equally spaced circumferentially along a disc 72 that is integrally carried by the sleeve 216 so as to rotate as a unit with the rotary table 56. The disc 72 is of larger diameter than would appear from Fig. 19, which shows only part of its hub. As there are ten platforms 140, there are ten such clamping jacks, spaced equally along the circumference of the disc 72, concentric with the rotary table 56. Corresponding to each platform 140 of the table 56, and opposite thereto, therefore, the disc 72 carries a plunger rod 208. The plunger rods 208, as shown more particularly in Fig. 16, are slidably mounted in the disc 72, but are prevented from rotating therein by keys 212.

As the table 56 continues to rotate in the direction of the arrow 45, to carry the untreated heel blank 3 resting on the platform 140 from the loading station toward the operating station, the corresponding plunger 208 actuates its jaw 206 laterally very forcibly toward the untreated heel blank 3, as will be more fully described hereinafter, in order to cause the jaw 206 to engage the other side face 17, thereby securely to clamp the said blank 3 firmly against the corresponding vertically disposed face of the table 56. The clamping action takes place at a time when the platform 140 occupies approximately its uppermost position, indicated at $a$ in Fig. 18. The platform 140 is so positioned that the heel-attaching or arch portion of the clamped heel block resting thereon shall be exposed, in order that this heel-attaching portion may be presented properly to the molding cutter 32. As the table 56 continues to rotate further in the direction of the arrow 45, therefore, carrying with it the platform 140 and the untreated heel blank 3 clamped thereon, it carries the clamped untreated heel blank 3, thin end 19 forward, counterclockwise, in the direction of the arrow 45, so that its heel-attaching or arch portion shall become engaged by the cutter 32. The cutter 32, therefore, commences its molding cutting action of the heel-attaching or arch portion on the thin edge 19 of each wedge-heel blank 3, and it molds the remaining portions of the untreated heel blank 3 continuously toward the thick end 15 of the wedge. This molding operation completed, the untreated wedge-heel blank 3 has become converted into the finished wedge-heel blank 1.

The completion of the operation of molding the heel blank 3 does not terminate the operation of the machine. After a predetermined further continued rotation of the table 56 about its horizontally disposed axis, in the direction of the arrow 45, the very firm clamping action of the jaw 206 upon the finished heel blank 1, as will hereinafter appear, will become greatly lessened, though it will be still effective, for a time, to hold the completed heel blank 1 lightly in place. After further continued rotation of the table 56 in the direction of the arrow 45, the jaw 206 will finally become completely disengaged from the said other side face 17 of the blank 3, and the finished heel blank 1 will drop along a chute 59 into a hopper 57, Figs. 1, 2 and 4.

This completes a predetermined cycle of clamping and unclamping of the wedge-heel blank 3. The shaping cutter 32 effects its cutting action during the portion of this predetermined cycle when the wedge-heel blanks 3 are clamped.

Each jack, as it reaches the loading station, becomes loaded with an untreated wedge-heel blank 3, which is then molded at the operating station. Since the machine is shown provided with ten jacks, ten untreated wedge-heel blocks 3 will become thus finished corresponding to each complete rotation of the table 56 in the direction of the arrow 45. The speed of the machine is regulated to perform this work as rapidly as the operator can properly load the machine.

If the cutter 32 were to occupy a fixed position during the molding of the heel-attaching or arch portion of the wedge-heel blank 3, the molded surface, instead of having the shape of the heel-and-shank portion of a shoe, would present merely a surface of revolution, the cross section of which would be the same as that of the cutter 32. The present invention obviates this difficulty by imparting a suitable oscillatory movement to the cutter 32 during its molding of the heel blank 3, thereby to effect the molding of the desired shape in the heel-attaching or arch portion of the heel blank 3.

To this end, the bearing 34, in which, as before stated, the cutter shaft 30 is journaled, is mounted, as shown in Figs. 1 to 4, upon arms 38 about a pivot shaft 36 that rocks in a bearing 40. One end of an arm 42 is secured by a key 21 to the pivot shaft 36. The other end of the arm 42 carries a cam-roll follower 44 in engagement with a rotary cam 66. The rotary movement of the cam 66 effects oscillatory movement of the cam-roll arm 42 to effect rocking movement of the pivot shaft 36. The rocking movement of the pivot shaft 36, in turn, is communicated to the cutter-shaft bearing 34, through the cutter-bearing arms 38. The bearing 34, therefore, oscillates back and forth once corresponding to each complete rotation of the cam 66 to effect an oscillatory movement of the cutter 32 once corresponding to each complete cycle of rotation of the cam 66.

As shown in Figs. 1 and 4 to 7, the cam 66 is mounted at one end of a shaft 62 that is journaled in bearings 64 of the frame support 24. In order to show the position of the cam 66 relative to the table 56 and the molding cutter 32, it is indicated in Fig. 15, by dotted lines, in contact with the rotary cam 44. The other end of the shaft 62 is provided with a pinion 60 that meshes with the teeth of an internal gear 58 provided upon the table 56, as illustrated in Figs. 1, 10 and 13. The cam 66, therefore, is rotated from the table 56. The gearing is so designed that the cam pinion 60 shall rotate ten times to every rotation of the internal table gear 58. As there are ten heel-receiving platforms and jacks 140 on the table 56, the cam 66 rotates once corresponding to each operation of the cutter 32 upon a wedge-heel blank 3.

As so far described, however, there would be nothing to prevent the cutter 32 from engaging, not only the untreated heel blanks 3, but also the platforms 140 upon which they rest. A stop 108, therefore, is provided, engageable by a stop rib 110 fastened to the cutter bearing 34, thereby to limit the downward oscillatory movement of the cutter shaft 30 mounted thereon and of the cutter 32 mounted on the shaft 30. The stop 108 is illustrated as a bolt that is threadably adjustable in a plate 54 secured to the frame 24, the bolt 108 being shown in Figs. 3 and 4 secured in threadably adjusted position by a nut.

Depending upon the shape of the cam 66, of course, the cutter 32 may be oscillated up and down to a varying extent, as the untreated heel blank 3 is carried past it by the rotary table 56. Though the transverse contour of the mold produced in the heel blank is still determined by the shape of the cutter 32, its longitudinal contour will now depend upon the degree of its oscillatory movement, as determined by the shape of the cam 66. By varying the shapes and sizes of both the cutter 32 and the cam 66, therefore, it is possible to obtain different-sized finished wedge-heel blanks 1 the shapes of the arch of which shall differ both in longitudinal and cross-sectional contour, thereby providing for arches of differing transverse inclination, as well. The heel-attaching or arch portion of the heel becomes thus inclined simultaneously with this molding operation, in order that the heel blank may become molded to the shape of the heel-and-shank portion of a shoe to which the heel is to be attached.

It is desirable, for reasons that will presently appear, to have a loose yielding connection between the cam 66 and the cutter 32. To the pivot shaft 36, therefore, to which the cam-roll arm 42 is fixed, as before explained, by the key 21, there is secured, as by means of a key shown in Fig. 3, a rest 46 for an adjusting screw 48. The adjusting screw 48 is threadably adjustable in a bar 100 that is fixed to the cutter-bearing arms 38. The cutter-bearing arms 38 are thus loosely connected pivotally about the pivot shaft 36. They are constrained to move with this pivot shaft, however, through the engagement of the rest 46 with the adjusting screw 48, as more particularly illustrated in Fig. 3. During the rotation of the table 56, and the consequent rotation of the cam 66, accordingly, as the cam 44 effects rocking movement of the pivot shaft 36, this rocking movement becomes communicated to the cutter-bearing arms 38, through the rest 46 and the adjusting screw 48, to effect rocking actuation of these arms 38 about the pivot shaft 36, toward and from the table 56, transversely to the path of travel of the wedge-heel blanks, and radially of the table 56.

A coiled tension spring 50, one end of which is secured to the frame 24 and the other end to a projecting lug 52 of the cutter bearing 34, maintains the adjusting screw 48 yieldingly in engagement with the rest 46. When the rotary cam 66, acting upon the cam roll 44, pivots the cam-roll arm 42 to rock it upward, however, the pivot shaft 36, rocking with the arm 42, rocks the rest 46 upward, as viewed in Fig. 3, thereby to raise the cutter 32.

The cutter 32 is thus caused to effect a complete oscillatory movement during each rotation of the cam 66, but through a yielding loose connection that may be adjusted by threadably adjusting the screw 46 and the bolt 108. The yielding loose connection between the pivot shaft 36 and the cutter 32 provides for adjustment for wear and to prevent injury to the cutter 32 and other parts of the machine, but it helps also to vary the shape of the completed heel blank 1 and to take care of different sizes and shapes of cutters 32.

A novel mounting is provided for facilitating ready removal of the cam 66 and its replacement by another cam 66. As shown clearly in Figs. 5 to 7, a cam-hub flange 112 is mounted on a reduced portion of the shaft 62, at the left of a shoulder 122, and is keyed thereto at 132. A cam hub 114 is adjustably secured on the cam-hub flange 112 by locking screws 118, shown also in Fig. 8. To provide for rotatable adjustment of the cam-hub 114 on the cam-hub flange 112, the heads of the screws 118 are mounted in elongated arcuate slots 120 of the cam-hub flange 112 concentric with the shaft 62. The cam hub 114 is provided with locking pins 116 adapted to be secured in locking openings 27 of the cam 66.

The cam-hub flange 112 is held against the shoulder 122 of the shaft 62, and the cam hub 114 is held on the hub flange 112, against the flange thereof, by a cam locking flange 68. The flange 68 is provided with a centrally disposed opening 138 by means of which it is mounted over a nut 124 that is threaded upon a terminally threaded extension 130 of the reduced portion of the shaft 62. The flange 68 is provided with locking projections 134 adapted to be received in correspondingly shaped locking openings 136 of the cam 66. The cam 66 is locked in place, with the locking pins 116 disposed in its openings 136, by a locking lever 70, pivoted on the nut 124 at 128. Pivotal movement of the locking lever 70 results in corresponding movement of an eccentric locking cam 126 to effect locking and unlocking of the cam 68 on the shaft 62. The eccentricity of the cam is not very great, but it is sufficient to cause pressure on the flange 68.

It is essential that the untreated wedge-heel blanks 3 be positioned accurately on their platforms 140, irrespective of the shape of the arch to be formed, else the arch, even though properly shaped by suitable choice of the cam 66 and the cutter 32, will not occupy its proper position on the finished wedge-heel blank 1. The same mechanism that, in accordance with a feature of the present invention, enables attaining this result provides also for tiltably adjusting the work-supporting platforms 140, in order to vary the thickness of the finished wedge-heel blanks 1. According to the present invention, this thickness may be varied without varying the position occupied by the thin edge 39 of the finished heel blank 1.

The platforms 140 are therefore each rendered tiltably adjustable about a line 142, at the forward end of the platform 140, as an axis. To this end, each platform 140 is integrally provided with a circularly cylindrical guide runner 144, the axis of the cylinder of which is coincident with the line 142. As shown in Figs. 9, 11 and 12, the cylindrical runner 144 is adjustably mounted upon a similarly shaped co-operating guide-runner bed 146 provided upon a bed block 156. To adjust the platform 140, all that is necessary is pivotally to slide its cylindrically shaped runner 144 along the corresponding cylindrically shaped runner bed 146. Such adjustment will result in the platforms 140 assuming different angular positions, as shown by full and dot-and-dash lines in Fig. 11, but without varying the position of the line 142 at the forward end of the platform 140. This line 142 therefore occupies always the same location on the table 56, at the center of the cylinder of the cylindrical guide runner 144, irrespective of the adjustments. During the rotation of the table 56, the lines 142 of the respective platforms 140 trace out a rotary cylinder concentric with the axis of rotation of the table 56. This cylinder is shown by dot-and-dashed lines in Figs. 9 and 15 as substantially tangent to the path of rotation of the cutting edges of the blades of the molding or shaping cutter 32. The lines 142, therefore, travel substantially to the region of cutting action of these blades. This enables the molding or shaping cutter 32 so to cut into the heel-attaching-portion face of the untreated wedge-heel blank 3 as to produce the thin edge 39 of the finished wedge-heel blank 1 along the line 142. The point of Figs. 9, 11 and 15 representing the line 142 of Fig. 12 will be referred to in the claims as a predetermined point of the platform 140.

As is shown clearly in Fig. 12, the runner 144 is wider than the platform 140 so that it projects out beyond both the inner and outer sides of the platform 140, at 148 and 150. A correspondingly shaped track block 152 is interposed between the rotary table 56 and the inner side of the platform 140 on the projecting portion 150 of the runner 144, and is secured to the rotary table 56 by screws 29. A similarly shaped track block 154, similarly disposed on the projecting outer portion 148 of the runner 144, is secured by screws 31 to the bed block 156. The bed block 156, in turn, is secured to the rotary table 56 by screws 33. An alining key 158 is disposed in oppositely disposed grooves of the rotary table 56 and the bed block 156 to maintain the bed block 156 in proper radial alinement on the table 56.

Each platform 140 may be tiltably adjusted by means of a turnbuckle 160, one end 162 of which is pivoted to the rear end of the platform 140, and the other end 164 of which is pivoted to a ring 166 that is concentric with the table 56.

This construction renders it possible not only to adjust each platform 140 individually by means of its turnbuckle 160, but also, once the platforms have been adjusted individually, to adjust all the platforms 140 simultaneously. All that is necessary, to attain this end, is to render the ring 166 rotatably adjustable about its center. According to the illustrated embodiment of the invention, this end is attained by providing the ring 166 with peripheral gear teeth, as shown in Figs. 9 to 11, meshing with an annular or hollow pinion 168. This ring 166 is maintained in place on the table 56, during its rotatable adjustment, by a retainer ring 170.

The turnbuckles 160 thus constitute links co-operating with the platforms 140 and the retainer ring 170 of the rotary carrier member 56 for simultaneously adjusting the angles of the platforms 140 while maintaining the predetermined points 142 always at the same positions relative to the rotary carrier 56.

After the pinion 168 has been turned to the proper degree to effect the desired rotatable adjustment of the ring 166, a conical plug 182 is forced into an interiorly provided terminal cone 186 of the hollow pinion 168 by threading an integral stud 198 of the plug 182 into corresponding internal threads of the pinion 168. As the internally conical portion 186 of the hollow pinion 168 is slotted, as shown at 180, the parts of the conical pinion 168, on opposite sides of the slots 180, become thus forced apart or expanded, causing external threads 196 of the pinion 168 to bind against corresponding threads of the rotary table 56 by means of which it is adjustably mounted on the table 56.

The gage stops 174 are individually adjustable in slots 176 of a ring 178 that is also concentric with the table 56, and they may be fixed in adjusted position by screws 179. After the gage stops 174 have all thus been adjusted individually, they may be adjusted simultaneously, to correspond to the simultaneous adjustment of the platforms 140, by rotatably adjusting the ring 178 about its center. The rotatable adjustment of the ring 178 may be effected in any desired manner, as by providing the ring 178, as shown in Figs. 9, 13 and 14, with a projection 200 having internal gear teeth meshing with an annular pinion 190 similar to the pinion 168. The internally conical wall of the pinion 190, slotted at 192, may be expanded by a conical plug 194, shown threaded at 198.

The pinions 168 and 198 may be expanded in any desired manner, as by means of a hexagonal wrench 204 that may be fitted into a correspondingly hexagonal socket 184 in the conical plug 182 or 194. In Fig. 10, the hexagonal socket 184 is shown in the conical end of the plug 182. In Figs. 13 and 14, it is shown in the threaded part 186 of the conical plug 194. In Figs. 10 and 11, moreover, the interior conical portion 186 of the pinion 168 is shown terminating in a hexagonal nut for receiving another hexagonal wrench 202, Fig. 14. By means of the two wrenches 202 and 204, a ready means is provided for effectively turning the conical plug 182 or 194 and the corresponding pinion 168 or 190 in opposite directions, either to lock or unlock the rotatably adjustable rings 166 and 178.

By means of the described adjustment, therefore, it is possible to cause the platforms 140 to occupy different small angles to the direction of rotation of the circumference of the rotary carrier 56 approximately equal to the angles of the wedges of different finished wedge-heel blanks 1, as shown below the cutter in Fig. 15.

It is now in order to describe the mechanism for locking the untreated heel blanks 3 on the platforms 140 between the table 56 and the clamping jaws 206.

The plunger rods 208 in the disc 72 that carry the clamping jaws 206 are each connected to a piston plunger 214, as shown more particularly in Fig. 16. The slidable movement of the plungers 208 is effected by pneumatic pressure acting on opposite sides of the piston plungers 214, each in an air-cylinder chamber or housing. As there are ten heel-blank-receiving platforms 140 and heel-blank-clamping jacks, there are correspondingly ten plunger rods 208, respectively connected to ten pistons 214, respectively operating in ten air-cylinder chambers or housings, indicated by the reference letters $a$ to $j$ in Figs. 1, 2 and 18.

The air cylinders are each provided with two air pipes at opposite ends of the cylinder for alternately admitting air under pressure thereto on opposite sides of the pistons 214. When air is admitted to a cylinder through one of the air pipes, on one side of its piston 214, air is correspondingly exhausted from the cylinder on the other side of the piston through the other air pipe. One of the two air pipes of each cylinder $a$ to $j$ is indicated by the same reference letter as the corresponding cylinder, but with the exponent 1. The other air pipe of the two air pipes of each cylinder is also indicated by the same reference letter as the corresponding cylinder, but with the exponent 2.

Considering the air cylinder $b$ shown in Fig. 16, for example, air may be admitted to one side thereof, at the left of the piston plunger 214, to force the plunger 208 to the right, through one end of an air pipe $b^2$. The air already in the cylinder will be correspondingly exhausted from the other side of the cylinder $b$, at the right of the piston plunger 214, through the corresponding end of an air pipe $b^1$. When air is admitted through the said one end of the air pipe $b^1$, on the other hand, the air already in the cylinder will be exhausted through the said one end of the air pipe $b^2$.

The other ends of the air pipes are connected through openings 242 in the spacing sleeve 240, as shown in Figs. 18 and 19, to respective air grooves horizontally extending longitudinally through the before-mentioned sleeve 216.

The air grooves in the sleeve 216, for convenience, are designated by the same exponent-provided reference letters as the air pipes to which they are connected. As there are ten letters provided with the exponent 1 and ten letters provided with the exponent 2, the sleeve 216 is shown in Fig. 18 provided with twenty air grooves, symmetrically arranged along the circumference of a circle. Two of these air pipes, diametrically opposite to each other, as appears from Fig. 18, are shown in Fig. 19 at $a^1$ and $f^1$.

A hubbed flange 220 is held in the air-valve housing 80 against the sleeve 216 by screws 264, Fig. 20. The hubbed flange 220 is provided with twenty air grooves respectively alined with the twenty air grooves of the sleeve 216. One of these is designated in Fig. 19 by the same reference letter $a^1$ as that of the corresponding air pipe of the sleeve 216 with which it is alined. Pipe plugs 266 are shown closing the holes produced in the process of drilling the air grooves in the hubbed flange 220.

A stuffing box 234 surrounds the hub of the hubbed flange 220 in the air-valve housing 80, with a packing 236 interposed. A disc valve 222 is held in place between the hub of the hubbed flange 220 and the outer wall of the stuffing box 234 by means of anchor pins 226 of an interposed anchor-and-baffle 224, shown anchored in holes 228 of the disc valve 222. The anchor-and-baffle 224 is provided with a terminal threaded stud 230 projecting through the outer wall of the stuffing box 234. A nut 232 threaded on the stud 230 holds the parts assembled.

The left-hand surface of the disc valve 222, as viewed in Figs. 19 and 22, is provided with a plurality of circular-arc openings each concentric with the axis of rotation of the shaft 20 and the table 56 rotatable therewith. These are shown also in Fig. 21, by dotted lines, but naturally reversed in position with respect to Fig. 22.

The arcuate openings 252 and 258 are disposed along a common circumference. The arcuate opening 252 extends through an angle of about 90 degrees, but the arcuate opening 258 is shorter. At the extreme left-hand end of the opening 252, as viewed in Fig. 22, a portion 250 of the opening 252 is shown extending completely through the disc valve 222, as shown also in Fig. 19, to constitute an air duct.

Along a common circumference disposed nearer to the center of the disc valve 222 than the arcuate openings 252 and 258 are two short arcuate openings 256 and 260. An extreme end of the opening 256, similar to the case of the opening 252, is provided with a portion 254 which, like the opening portion 250, extends completely through the disc valve 222, as shown also by dotted lines in Fig. 19, to constitute an air duct.

The openings 258 and 260 are shown in communicating relationship, in order that air in one may travel also to the other, and they connect also to one end of an opening 262, the other end of which is disposed at the center of the disc valve 222, in order to constitute a duct for constant communication with an exhaust duct K that extends horizontally along the axis of rotation of the table 56 through the hubbed flange 220 and the shaft 20, as shown more particularly in Fig. 19, to the atmosphere.

The arcuate openings are so disposed that, during the rotation of the table 56, the ducts bearing the reference letters with the exponent 1 will become successively alined with the arcuate openings 252 and 258, and the ducts bearing the reference letters provided with the exponent 2 will become successively alined with the arcuate openings 256 and 260. Air is admitted to the stuffing box 234 from an outside source of air pressure through an air inlet 82. The air in the stuffing box 234 is admitted to the opposite sides of the air cylinders by way of the air openings 252 and 256 through the air ducts 250 and 254, respectively. The air ducts 258 and 260 exhaust opposite sides of the air cylinders to the atmosphere by way of the air duct 262 and the exhaust duct K.

As the pneumatic clamping and unclamping of all the heel blanks is the same, it will suffice to describe the operation in connection with one of them. Let it therefore be assumed that the untreated heel blank 3 is about to be clamped by the jaw 206, the plunger 208 of which is controlled by the cylinder $a$. In Fig. 19, for example, air under pressure in the stuffing box 234 is shown traveling, by way of the air duct 250 in the disc valve 222, to the air-inlet duct $a^1$ in the hubbed flange 220, as indicated diagrammatically by the arrows of Fig. 22. The air continues traveling from the hubbed flange 220 into the air-inlet duct $a^1$ of the sleeve 216, as indicated by the arrows of Fig. 23. From the sleeve 216, the air travels, by way of the inlet air pipe $a^1$, to the right side of the cylinder $a$, as viewed in Fig. 16.

At the same time, air is exhausted from the left side of the cylinder $a$, by way of the air pipe $a^2$, through the air duct $a^2$ of the sleeve 216, by way of the arrows shown in Fig. 23, to the air duct $a^2$ of the hubbed flange 220. The exhaust continues by way of the arrows shown in Fig. 22, to the air opening 260 of the disc valve 222; and, by way of the air duct 262, to the exhaust duct K.

The piston plunger 214 will therefore be moved to the left, as viewed in Fig. 16, to actuate the plunger 208 of the corresponding clamping jack to the left, thereby to effect the clamping of the unfinished heel blank 3 to the rotary table 56.

As the table 56 continues to rotate in the direction of the arrow 45, the air duct $j^1$ will next come into alinement with the air duct 250 of the disc valve 222. The next untreated heel block 3 to the right, as viewed in Figs. 9 and 15, will thereupon similarly become clamped, and the untreated heel blank 3 previously clamped will be carried by the rotary table 56 into the cutter 32. This previously clamped heel block 3 will remain clamped at this time, because the air opening 252, which communicates with the air duct 250, is long enough so that it shall still cover the air duct $a'$ of the sleeve 216, and the air duct 260 still covers the air duct $a^2$ of the flanged hub 220.

The air opening 252 is long enough, indeed, so that this previously clamped untreated heel blank 3 shall remain clamped even after the rotary table 56 has moved still further, to uncover the next air duct $i^1$ to the air duct 250. As is clear from Fig. 22, the air opening 252 is long enough to span three air ducts at one and the same time, illustrated as the air ducts $a^1$, $b^1$ and $c^1$. In this position, however, the air duct $a^2$ of the flanged hub 220 will have traveled beyond the limits of the air duct 260; as shown in the same Fig. 22, the air duct 260 is long enough to span only two air ducts, shown as $a^2$ and $b^2$. Though the air pressure is still exerted on the right-hand side of the piston plunger 214, as viewed in Fig. 16, therefore, the left-hand side of this piston plunger 214 is no longer freely open, so as to exhaust to the atmosphere. A degree of clamping action is still exerted upon the heel block, but this is rather light. The firm clamping action is no longer needed, since the cutter 32 has now completed the molding of the heel. The finished heel blank 1, therefore will still be clamped on the jack, though with lighter pressure than was the case so long as the right-hand side of the piston plunger 214 was maintained in communication with the source of air pressure. The heel blank has thus been held clamped; first, very tightly, including the time during which the untreated heel blank 3 was operated upon by the molding cutter 32, and then lightly, after the completion of the finished heel blank 1.

In due time, with continued rotation of the table 56, the air duct $a^1$ of the hubbed flange 220, having traveled beyond the limits of the air opening 252, will become alined with the air opening 253, and the air duct $a^2$ with the air opening 256. The air under pressure in the stuffing box 234, entering through the air duct 254 and the air opening 256, will travel into the air duct $a^2$ of the hubbed flange 220, as indicated by the arrows shown in Fig. 22, then into the air duct $a^2$ of the sleeve 216, as indicated by the arrows shown in Fig. 23, and into the air pipe $a^2$. Air under pressure will now, therefore, travel into the cylinder $a$ from the left, as viewed in Fig. 16. The air in the cylinder $a$ to the right of the piston plunger 224 will at the same time exhaust by way of the air pipe $a^1$, and by way of the air ducts $a^1$ in the sleeve 216 and the hubbed flange 220, to travel to the air opening 258. The air will then exhaust by way of the air duct 258 and the exhaust duct K, as before described. The jaw 206 of this jack will thereupon be automatically caused to release the completed blank 3, which will thereupon automatically slide along a chute 59, to fall into a hopper receptacle 57.

The finished heel blank 1 is sometime defective. If the operator who is loading the untreated blank 3 should observe this to be the case, he may prevent its falling into the receptacle 57 by striking it a light blow with his hand at a time before the clamping action of the jaw 206 upon the finished heel blank 1 is completely released, and while it is sufficiently light, as before described, to permit this to be done. This light blow the operator may give without, in any way, interrupting the loading of the untreated heel blanks 3 at the loading station.

At predetermined points in the rotation of the table 56, therefore, the air ducts of the jacks become successively connected, first with the source of air pressure, and then with the atmosphere. This causes the corresponding plunger 208, that carries the corresponding clamping jaw 206, first to move to the left, as viewed in Fig. 16, in response to pneumatic pressure, into clamping engagement with an untreated heel blank 3, and then to move to the right, in order to unclamp the finished heel blank 1, with an intermediate period of light clamping action.

As the degree of clamping action of the jaws 206 upon the untreated heel blanks 3 depends upon the degree of travel of the piston plungers 214, it is desirable to adjust the position of the air cylinders to correspond to different thicknesses of finished wedge heel blanks 1. To this end, the frame support 76 is carried by a bed 84 that may be slidably adjusted to the right and to the left, as viewed in Fig. 1, on a base 2. The bed 84 is maintained accurately alined during its adjustment by a guiding key 90, Fig. 1. The slidable adjustment of the bed 84 may be effected in any desired manner, as by means of a hand wheel 98 for rotating a screw 92 that is freely connected to the support 76, but is held between anchor bearings 94 of the base 2 by a shoulder 96. The parts may be locked in slidably adjusted positions by bolts 86 is elongated slots 88. This construction makes it possible to adjust the support 76 with the disc 72, carrying the clamping-jaw plungers 208, to the right and to the left, as viewed in Fig. 1. In Fig. 19, there is shown a space between the end of the shaft 20 and the hubbed flange 220 to permit of this adjustment.

Modifications will occur to persons skilled in the art, and all such are considered to fall within the spirit and scope of the invention, as defined in the appended claims.

What is claimed is:

1. A wedge-heel-making machine having, in combination, a support, means for clamping a wedge-heel blank to the support with the heel-attaching portion thereof exposed, a pivot shaft, an arm loosely pivoted about the shaft, shaping cutter means mounted on the arm, means for variably pivoting the pivot shaft, means for relatively moving the support and the arm toward each other to cause the exposed heel-attaching portion of the heel blank to be engaged by the cutter means during such relative movement, and cooperating means between the arm and the pivot shaft for connecting the arm to the pivot shaft to cause the cutter means, during such relative movement, to shape the heel-attaching portion of the heel blank substantially to the shape of the heel-and-shank portion of a shoe to which the heel is to be attached.

2. A machine for molding wedge-heel blanks each provided with a thin end, a thick end, side faces, a tread face and a heel-attaching-portion face having, in combination, a rotatable table, a disc rotatable with the table, a plurality of the wedge-heel blanks being adapted to be mounted on the table with one of the side faces of each wedge-heel blank disposed adjacent to the table, its thin and thick ends spaced from each other along the circumference of the table, and its heel-attaching-portion face exposed, means carried by the disc for engaging the other side face of each wedge-heel blank to clamp such wedge-heel blank on the table at a predetermined point along the circular path of rotation of the table and the disc, a molding cutter disposed along the circular path of rotation of the table, means for rotating the table and the disc to cause the exposed heel-attaching-portion faces of the wedge-heel blanks to become engaged by the cutter, means for unclamping the wedge-heel blanks at a second predetermined point along the circular path of rotation of the table, and means for relatively adjusting the table and the disc in order to clamp heel blanks of varying thicknesses.

3. In a machine for molding a wedge-heel blank provided with a thin end, a thick end, side faces, a tread face and a heel-attaching-portion face, a support provided with a circularly cylindrical guide-runner bed, a platform provided with a circularly cylindrical guide runner the cylinder of which is similar to the cylinder of the guide-runner bed and that is angularly adjustable upon the guide-runner bed, the wedge-heel blank being adapted to be mounted on the support with its tread face disposed adjacent to the platform, one of its side faces disposed adjacent to the support, its thin and thick ends spaced from each other along the support, its heel-attaching-portion face disposed adjacent to the said path, and its thin edge disposed adjacent to a point of the platform at the center of the cylinder of the guide runner, and means for clamping the wedge-heel blank on the support.

4. In a machine for molding wedge-heel blanks each provided with a thin end, a thick end, side faces, a tread face and a heel-attaching-portion face, a rotatable table provided with a plurality of circularly cylindrical guide-runner beds, a plurality of platforms respectively provided with circularly cylindrical guide runners the cylinders of which are similar to the cylinders of the guide-runner beds and that are angularly adjustable upon their respective guide-runner beds, a plurality of the wedge-heel blanks being adapted to be mounted on the table with the tread face of each wedge-heel blank disposed adjacent to one of the platforms, one of its side faces disposed adjacent to the table, its thin and thick ends spaced from each other along the circumference of the table, its thin edge disposed adjacent to a point of the said one platform at the center of the cylinder of the guide runner of the said one platform, and its heel-attaching-portion face exposed, means for engaging the other side face of each wedge-heel blank to clamp such wedge-heel blank on the table, a ring concentric with the table, and means connecting the ring and the platforms, the ring being angularly adjustable about its center to adjust the guide runners simultaneously on their guide-runner beds through the means connecting the ring and the platforms in order to effect simultaneous angular adjustment of the platforms.

5. In a machine for molding wedge-heel blanks each provided with a thin end, a thick end, side faces, a tread face and a heel-attaching-portion face, a rotatable table having a plurality of platforms and a plurality of stops, one corresponding to each platform, a plurality of the wedge-heel blanks being adapted to be mounted on the table with the tread face of each wedge-heel blank disposed adjacent to one of the platforms, one of its side faces disposed adjacent to the table, its thin and thick ends spaced from each other along the circumference of the table, its thin end disposed adjacent to a point of the said one platform, its heel-attaching-portion face exposed, and with the thick ends of the wedge-heel blanks in engagement with the respective stops, means for engaging the other side face of each wedge-heel blank to clamp such wedge-heel blank on the table, means for angularly adjusting the platforms about the said points of the respective platforms, a ring concentric with the table, and means connecting the ring and the stops, the ring being angularly adjustable about its center to adjust the stops simultaneously through the means connecting the ring and the stops in order to effect simultaneous angular adjustment of the stops.

6. A machine for shaping wedge-heel blanks each provided with a thin end, a thick end, side faces, a tread face and a heel-attaching-portion face having, in combination, rotary shaping-cutter means, means for rotating the cutter means, a support, means for relatively moving the cutter means and the support, a platform mounted on the support at a small angle to the direction of relative movement of the cutter means and the support approximately equal to the angle of the wedge of the shaped or finished wedge-heel blanks, the platform being adjustable on the support about a predetermined point with respect to the platform disposed along a path that is substantially tangent to the path of cutting action of the cutter means in order that the said predetermined point shall travel along the said substantially tangent path to and past substantially the region of the cutting action of the cutter means during the relative movement of the cutter means and the support, the wedge-heel blank being adapted to be mounted on the support with one of its side faces disposed adjacent to the support, its tread face disposed adjacent to the platform, its thin and thick ends spaced from each other along the support in the direction of relative movement of the cutter means and the support, and its heel-attaching-portion face exposed, and with the thin end of the wedge disposed adjacent to the predetermined point, a movable clamping jaw, means for actuating the movable clamping jaw into engagement with the other side face of the wedge-heel blank to clamp the wedge-heel blank against the support and for disengaging the clamping jaw from said other side face of the wedge-heel blank to unclamp the wedge-heel blank from the support in a predetermined cycle, means for relatively moving the cutter means and the support to move the wedge-heel blank to and past substantially the said region during the portion of the predetermined cycle when the wedge-heel blank is clamped to the support, and cooperative means on the platform and the support for maintaining the predetermined point always at the same position relative to the support irrespective of the adjustment of the platform.

7. A machine for shaping wedge-heel blanks each provided with a thin end, a thick end, side faces, a tread face and a heel-attaching-portion face having, in combination, rotary shaping-cutter means, means for rotating the cutter means, a support, means for relatively moving the cutter means and the support, a platform mounted on the support at a small angle to the direction of relative movement of the cutter means and the support approximately equal to the angle of the wedge of the shaped or finished wedge-heel blanks, the platform being adjustable on the support about a predetermined point with respect to the platform disposed along a path that is substantially tangent to the path of cutting action of the cutter means in order that the said predetermined point shall travel along the said substantially tangent path to and past substantially the region of the cutting action of the cutter means during the relative movement of the cutter means and the support, a stop mounted on the support, the wedge-heel blank being adapted to be mounted on the support with one of its side faces disposed adjacent to the support, its tread face disposed adjacent to the platform, its thin and thick ends spaced from each other along the support in the direction of relative movement of the cutter means and the support, and its heel-attaching-portion face exposed, with the thick end of the wedge disposed against the stop, and with the thin end of the wedge disposed adjacent to the predetermined point, a movable clamping jaw, means for actuating the movable clamping jaw into engagement with the other side face of the wedge-heel blank to clamp the wedge-heel blank against the support and for disengaging the clamping jaw from said other side face of the wedge-heel blank to unclamp the wedge-heel blank from the support in a predetermined cycle, means for relatively moving the cutter means and the support to move the wedge-heel blank to and past substantially the said region during the portion of the predetermined cycle when the wedge-heel blank is clamped to the support, and cooperative means on the platform and the support for maintaining the predetermined point always at the same position relative to the support irrespective of the adjustment of the platform.

8. A machine for shaping wedge-heel blanks each provided with a thin end, a thick end, side faces, a tread face and a heel-attaching-portion face having, in combination, rotary shaping-cutter means, means for rotating the cutter means, a support, means for relatively moving the cutter means and the support, a plurality of platforms mounted on the support each at a small angle to the direction of relative movement of the cutter means and the support approximately equal to the angle of the wedge of the shaped or finished wedge-heel blanks, the platforms being adjustable on the support each about a predetermined point with respect to each platform disposed along a path that is substantially tangent to the path of cutting action of the cutter means in order that the said predetermined points shall travel along the said substantially tangent path to and past substantially the region of the cutting action of the cutter means during the relative movement of the cutter means and the support, the wedge-heel blanks being adapted to be mounted on the support with one of the side faces of each wedge-heel blank disposed adjacent to the support, its tread face disposed adjacent to one of the platforms, its thin and thick ends spaced from each other along the support in the direction of relative movement of the cutter means and the support, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the support and for disengaging the respective movable clamping jaws from the said other side faces of the respective wedge-heel blanks to unclamp the respective wedge-heel blanks from the support in a predetermined cycle, means for relatively moving the cutter means and the support to move the wedge-heel blanks to and past substantially the said region during the portion of the predetermined cycle when the wedge-heel blanks are clamped to the support and cooperative means on the platform and the support for maintaining the respective predetermined points always at the same respective positions relative to the support irrespective of the adjustments of the respective platforms.

9. A machine for shaping wedge-heel blanks each provided with a thin end, a thick end, side faces, a tread face and heel-attaching-portion face having, in combination, rotary shaping-cutter means, means for rotating the cutter means, a support, means for relatively moving the cutter means and the support, a plurality of platforms mounted on the support each at a small angle to the direction of relative movement of the cutter means and the support approximately equal to the angle of the wedge of the shaped or finished wedge-heel blanks, the platforms being adjustable on the support each about a predetermined point with respect to each platform disposed along a path that is substantially tangent to the path of cutting action of the cutter means in order that the said predetermined points shall travel along the said substantially tangent path to and past substantially the region of the cutting action of the cutter means during the relative movement of the cutter means and the support, a plurality of stops mounted upon the support, the wedge-heel blanks being adapted to be mounted on the support with one of the side faces of each wedge-heel blank disposed adjacent to the support, its tread face disposed adjacent to one of the platforms, its thin and thick ends spaced from each other along the support in the direction of relative movement of the cutter means and the support, and its heel-attaching-portion face exposed, with the thick ends of the wedges disposed against the respective stops, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the support and for disengaging the respective movable clamping jaws from the said other side faces of the respective wedge-heel blanks to unclamp the respective wedge-heel blanks from the support in a predetermined cycle, means for relatively moving the cutter means and the support to move the wedge-heel blanks to and past substantially the said region during the portion of the predetermined cycle when the wedge-heel blanks are clamped to the support, and coöperative means on the platform and the support for maintaining the respective predetermined points always at the same respective positions relative to the support irrespective of the adjustments of the respective platforms.

10. A machine for shaping wedge-heel blanks each provided with a thin end, a thick end, side faces, a tread face and a heel-attaching-portion face having, in combination, rotary shaping-cutter means, means for rotating the cutter means, a support, means for relatively moving the cutter means and the support, a plurality of platforms mounted on the support each at a small angle to the direction of relative movement of the cutter means and the support approximately equal to the angle of the wedge of the shaped or finished wedge-heel blanks, the platforms being positioned on the support so that a predetermined point with respect to each platform is disposed along a path that is substantially tangent to the path of cutting action of the cutter means in order that the said predetermined points shall travel along the said substantially tangent path to and past substantially the region of the cutting action of the cutter means during the relative movement of the cutter means and the support, the wedge-heel blanks being adapted to be mounted on the support with one of the side faces of each wedge-heel blank disposed adjacent to the support, its tread face disposed adjacent to one of the platforms, its thin and thick ends spaced from each other along the support in the direction of relative movement of the cutter means and the support, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the support and for disengaging the respective movable clamping jaws from said other side faces of the respective wedge-heel blanks to unclamp the respective wedge-heel blanks from the support in a predetermined cycle, and means for relatively moving the cutter means and the support to move the wedge-heel blanks to and past substantially the said region during the portion of the predetermined cycle when the wedge-heel blanks are clamped to the support.

11. A machine for shaping wedge-heel blanks each provided with a thin end, a thick end, side faces, a tread face and a heel-attaching-portion face having, in combination, rotary shaping-cutter means, means for rotating the cutter means, a movable support, a plurality of platforms mounted on the support each at a small angle to the direction of movement of the support approximately equal to the angle of the wedge of the shaped or finished wedge-heel blanks, the platforms being positioned on the support so that a predetermined point with respect to each platform is disposed along a path that is substantially tangent to the path of cutting action of the cutter means in order that the said predetermined points shall travel along the said substantially tangent path to and past substantially the region of the cutting action of the cutter means during the movement of the support, the wedge-heel blanks being adapted to be mounted on the support with one of the side faces of each wedge-heel blank disposed adjacent to the support, its tread face disposed adjacent to one of the platforms, its thin and thick ends spaced from each other along the support in the direction of movement of the support, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the support and for disengaging the respective movable clamping jaws from the said other side faces of the respective wedge-heel blanks to unclamp the respective wedge-heel blanks from the support in a predetermined cycle, means for moving the support to move the wedge-heel blanks to and past substantially the said region during the portion of the predetermined cycle when the wedge-heel blanks are clamped to the support, the cutter means being actuable in a direction transverse to the direction of movement of the support, a cam actuable through a cycle, means connected to the cutter means and engageable with the cam to actuate the cutter means along the said transverse direction in response to the actuation of the cam, and means for actuating the cam through the cycle at each presentation of a wedge-heel blank to the cutter means by the clamping means to actuate the cutter means along the said transverse direction during such presentation of the clamped wedge-heel blank to cause the cutter means to shape the heel-attaching-portion faces of the wedge-heel blanks substantially to the shapes, as determined by the cam, of the heel-and-shank portions of shoes to which the wedge heels are to be attached.

12. A machine for shaping wedge-heel blanks each provided with a thin end, a thick end, side faces, a tread face and a heel-attaching-portion face having, in combination, a rotatable table, rotary shaping-cutter means disposed along the circular path of rotation of the table, means for rotating the cutter means, a plurality of platforms mounted on the table along its circumference each at a small angle to the said circular path of rotation of the table approximately equal to the angle of the wedge of the shaped or finished wedge-heel blanks, the platforms being positioned on the table so that a predetermined point with respect to each platform is disposed along a path that is substantially tangent to the path of cutting action of the cutter means in order that the said predetermined points shall travel along the said substantially tangent path to and past substantially the region of the cutting action of the cutter means during the rotation of the table, the wedge-heel blanks being adapted to be mounted on the table with one of the side faces of each wedge-heel blank disposed adjacent to the table, its tread face disposed adjacent to one of the platforms, its thin and thick ends spaced from each other along the circumference of the table in the direction of rotation of the table, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the table and for disengaging the respective movable clamping jaws from said other side faces of the respective wedge-heel blanks to unclamp the respective wedge-heel blanks from the table in a predetermined cycle, and means for rotating the table to move the wedge-heel blanks along the said circular path to and past substantially the said region during the portion of the predetermined cycle when the wedge-heel blanks are clamped to the table.

13. A machine for shaping wedge-heel blanks each provided with a thin end, a thick end, side faces, a tread face and a heel-attaching-portion face having, in combination, a rotatable table, rotary shaping-cutter means disposed along the circular path of rotation of the table, means for rotating the cutter means, a plurality of platforms mounted on the table along its circumference each at a small angle to the said circular path of rotation of the table approximately equal to the angle of the wedge of the shaped or finished wedge-heel blanks, the platforms being positioned on the table so that a predetermined point with respect to each platform is disposed along a path that is substantially tangent to the path of cutting action of the cutter means in order that the said predetermined points shall travel along the said substantially tangent path to and past substantially the region of the cutting action of the cutter means during the rotation of the table, the wedge-heel blanks being adapted to be mounted on the table with one of the side faces of each wedge-heel blank disposed adjacent to the table, its tread face disposed adjacent to one of the platforms, its thin and thick ends spaced from each other along the circumference of the table in the direction of rotation of the table, and its heel-attaching portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the table and for disengaging the respective movable clamping jaws from the said other side faces of the respective wedge-heel blanks to unclamp the respective wedge-heel blanks from the table in a predetermined cycle, means for rotating the table to move the wedge-heel blanks along the said circular path to and past substantially the said region during the portion of the predetermined cycle when the wedge-heel blanks are clamped to the table, means for simultaneously adjusting the platforms on the table, and cooperative means on the platforms and the tables for maintaining the respective predetermined points always at the same respective positions relative to the table irrespective of the adjustments of the respective platforms.

14. A machine for shaping wedge-heel blanks each provided with a thin end, a thick end, side faces, a tread face and a heel-attaching-portion face having, in combination, two members, namely, a rotatable wedge-heel blank carrier member upon which are mounted a plurality of platforms and a member upon which a rotary shaping cutter is rotatably mounted along the path of travel of the platforms during the rotation of the carrier member, means for rotating the cutter, the platforms being mounted on the carrier member each at a small angle to the direction of rotation of the carrier member approximately equal to the angle of the wedge of the shaped or finished wedge-heel blanks, the platforms being positioned on the carrier member so that a predetermined point with respect to each platform is disposed along a path that is substantially tangent to the path of cutting action of the cutter in order that the said predetermined points shall travel along the said substantially tangent path to and past substantially the region of the cutting action of the cutter during the rotation of the carrier member, the wedge-heel blanks being adapted to be mounted on the carrier member with one of the side faces of each wedge-heel blank disposed adjacent to the carrier member, its tread face disposed adjacent to one of the platforms, its thin and thick ends spaced from each other along the carrier member in the direction of rotation of the carrier member, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the carrier member and for disengaging the respective movable clamping jaws from the said other side faces of the respective wedge-heel blanks to unclamp the respective wedge-heel blanks from the carrier member in a predetermined cycle, means for rotating the carrier member to move the wedge-heel blanks to and past substantially the said region during the portion of the predetermined cycle when the wedge-heel blanks are clamped to the carrier member, and means for oscillating one of the members toward and from the other member during the rotation of the carrier member in order to control the degree of cutting action of the cutter upon the heel-attaching-portion faces of the wedge-heel blanks as the wedge-heel blanks travel to and past substantially the said region in order to cause the cutter to shape the heel-attaching-portion faces of the wedge-heel blanks substantially to the shapes of the heel-and-shank portions of the shoes to which the wedge heels are to be attached.

15. A machine for shaping wedge-heel blanks each provided with a thin end, a thick end, side faces, a tread face and a heel-attaching portion face having, in combination, a rotatable wedge-heel-blank carrier member upon which are mounted a plurality of platforms, a rotary shaping cutter rotatably mounted along the path of travel of the platforms during the rotation of the carrier member, means for rotating the cutter, the platforms being mounted on the carrier member each at a small angle to the direction of rotation of the carrier member approximately equal to the angle of the wedge of the shaped or finished wedge-heel blanks, the platforms being positioned on the carrier member so that a predetermined point with respect to each platform is disposed along a path that is substantially tangent to the path of cutting action of the cutter in order that the said predetermined points shall travel along the said substantially tangent path to and past substantially the region of the cutting action of the cutter during the rotation of the carrier member, the wedge-heel blanks being adapted to be mounted on the carrier member with one of the side faces of each wedge-heel blank disposed adjacent to the carrier member, its tread face disposed adjacent to one of the platforms, its thin and thick ends spaced from each other along the carrier member in the direction of rotation of the carrier member, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the carrier member and for disengaging the respective movable clamping jaws from the said other side faces of the respective wedge-heel blanks to unclamp the respective wedge-heel blanks from the carrier member in a predetermined cycle, means for rotating the carrier member to move the wedge-heel blanks to and past substantially the said region during the portion of the predetermined cycle when the wedge-heel blanks are clamped to the carrier member, and means for oscillating the cutter toward and from the carrier member during the rotation of the carrier member in order to control the degree of cutting action of the cutter upon the heel-attaching-portion faces of the wedge-heel blanks as the wedge-heel blanks travel to and past substantially the said region in order to cause the cutter to shape the heel-attaching-portion faces of the wedge-heel blanks substantially to the shapes of the heel-and-shank portions of the shoes to which the wedge heels are to be attached.

16. A machine for shaping wedge-heel blanks each provided with a thin end, a thick end, side faces, a tread face and a heel-attaching-portion face having, in combination, a frame, two members mounted on the frame, namely, a rotatable wedge-heel blank carrier member upon which are mounted a plurality of platforms and a member upon which a rotary shaping cutter is rotatably mounted along the path of travel of the platforms during the rotation of the carrier member, means for rotating the cutter, the platforms being mounted on the carrier member each at a small angle to the direction of rotation of the carrier member approximately equal to the angle of the wedge of the shaped or finished wedge-heel blanks, the platforms being positioned on the carrier member so that a predetermined point with respect to each platform is disposed along a path that is substantially tangent to the path of cutting action of the cutter in order that the said predetermined points shall travel along the said substantially tangent path to and past substantially the region of the cutting action of the cutter during the rotation of the carrier member, the wedge-heel blanks being adapted to be mounted on the carrier member with one of the side faces of each wedge-heel blank disposed adjacent to the carrier member, its tread face disposed adjacent to one of the platforms, its thin and thick ends spaced from each other along the carrier member in the direction of rotation of the carrier member, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the carrier member and for disengaging the respective movable clamping jaws from the said other side faces of the respective wedge-heel blanks to unclamp the respective wedge-heel blanks from the carrier member in a predetermined cycle, means for rotating the carrier member to move the wedge-heel blanks to and past substantially the said region during the portion of the predetermined cycle when the wedge-heel blanks are clamped to the carrier member, and means comprising a cam mounted upon the frame and cam-follower means mounted upon one of the members for effecting relative oscillation of the members toward and from each other during the rotation of the carrier member in order to control the degree of cutting action of the cutter upon the heel-attaching-portion faces of the wedge-heel blanks as the wedge-heel blanks travel to and past substantially the said region in order to cause the cutter to shape the heel-attaching-portion faces of the wedge-heel blanks substantially to the shapes of the heel-and-shank portions of the shoes to which the wedge-heels are to be attached.

17. A machine for shaping-wedge-heel blanks each provided with a thin end, a thick end, side faces, a tread face and a heel-attaching-portion face having, in combination, two members, namely, a rotatable wedge-heel-blank carrier member upon which are mounted a plurality of platforms and a member upon which a rotary shaping cutter is rotatably mounted along the path of travel of the platforms during the rotation of the carrier member, means for rotating the cutter, the platforms being mounted on the carrier member each at a small angle to the direction of rotation of the carrier member approximately equal to the angle of the wedge of the shaped or finished wedge-heel blanks, the platforms being adjustable on the carrier member each about a predetermined point with respect to each platform disposed along a path that is substantially tangent to the path of cutting action of the cutter in order that the said predetermined points shall travel along the said substantially tangent path to and past substantially the region of the cutting action of the cutter during the rotation of the carrier member, the wedge-heel blanks being adapted to be mounted on the carrier member with one of the side faces of each wedge-heel blank disposed adjacent to the carrier member, its tread face disposed adjacent to one of the platforms, its thin and thick ends spaced from each other along the carrier member in the direction of rotation of the carrier member, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the carrier member and for disengaging the respective movable clamping jaws from the said other side faces of the respective wedge-heel blanks to unclamp the respective wedge-heel blanks from the carrier member in a predetermined cycle, means for rotating the carrier member to move the wedge-heel blanks to and past substantially the said region during the portion of the predetermined cycle when the wedge-heel blanks are clamped to the carrier member, means for effecting relative oscillation of the members toward and from each other during the rotation of the carrier member in order to control the degree of cutting action of the cutter upon the heel-attaching-portion faces of the wedge-heel blanks as the wedge-heel blanks travel to and past substantially the said region in order to cause the cutter to shape the heel-attaching-portion faces of the wedge-heel blanks substantially to the shapes of the heel-and-shank portions of the shoes to which the wedge heels are to be attached, means associated with the respective platforms for angularly adjusting the platforms on the carrier member about the respective predetermined points while maintaining the respective predetermined points always at the same respective positions on the carrier member irrespective of the adjustments of the respective platforms, and means connecting the adjusting means for effecting simultaneous adjustment of the platforms about the respective predetermined points.

18. A machine for shaping wedge-heel blanks each provided with a thin end, a thick end, side faces, a tread face and a heel-attaching-portion face having, in combination, rotary shaping-cutter means, means for rotating the cutter means, a support, means for relatively moving the cutter means and the support, a plurality of platforms mounted on the support each at a small angle to the direction of relative movement of the cutter means and the support approximately equal to the angle of the wedge of the shaped or finished wedge-heel blanks, the platforms being positioned on the support so that a predetermined point with respect to each platform is disposed along a path that is substantially tangent to the path of cutting action of the cutter means in order that the said predetermined points shall travel along the said substantially tangent path to and past substantially the region of the cutting action of the cutter means during the relative movement of the cutter means and the support, the wedge-heel blanks being adapted to be mounted on the support with one of the side faces of each wedge-heel blank disposed adjacent to the support, its tread face disposed adjacent to one of the platforms, its thin and thick ends spaced from each other along the support in the direction of relative movement of the cutter means and the support, and its heel-attaching-portion face exposed, and with the thin ends of the wedges disposed adjacent to the respective predetermined points, a plurality of movable clamping jaws, one corresponding to each platform, means for actuating the respective movable clamping jaws into engagement with the other side faces of the respective wedge-heel blanks to clamp the respective wedge-heel blanks against the support and for disengaging the respective movable clamping jaws from said other side faces of the respective wedge-heel blanks to unclamp the respective wedge-heel blanks from the support in a predetermined cycle, means for relatively moving the cutter means and the support to move the wedge-heel blanks to and past substantially the said region during the portion of the predetermined cycle when the wedge-heel blanks are clamped to the support, means engaging the cutter means actuable through a cycle to cause the cutter means to shape the heel-attaching-portion faces of the wedge-heel blanks substantially to the shapes of the heel-and-shank portions of shoes to which the wedge-heels are to be attached, and means for actuating the actuable means through the cycle at each presentation of a wedge-heel blank to the cutter means by the clamping means.

GEORGE R. CONSTANTINE.
ARTHUR F. BALL.

References Cited in the file of this patent

UNITED STATES PATENTS

| Number | Name | Date |
|---|---|---|
| 250,167 | Parker | Nov. 29, 1881 |
| 1,066,684 | Turner | July 8, 1913 |
| 1,227,156 | Koehler | May 22, 1917 |
| 1,647,028 | Whitney | Oct. 25, 1927 |
| 1,822,501 | Onsrud | Sept. 8, 1931 |
| 1,855,528 | Onsrud | Apr. 26, 1932 |
| 1,860,789 | Sawyer | May 31, 1932 |
| 1,862,898 | Knight | June 14, 1932 |
| 1,921,715 | Whitney et al. | Aug. 8, 1933 |
| 1,953,297 | Good | Apr. 3, 1934 |
| 2,202,082 | Berkstresser | May 28, 1940 |
| 2,418,396 | Carr | Apr. 1, 1947 |
| 2,573,692 | Constantine | Nov. 6, 1951 |